United States Patent [19]

Higgins et al.

[11] 4,344,781
[45] Aug. 17, 1982

[54] FILTER BAG WITH PROTECTIVE CUFF

[75] Inventors: Frank Higgins, New Providence; Gilbert G. Lautenshlager, West Millington, both of N.J.; Billy A. Bunn, Aiken, S.C.

[73] Assignee: United States Filter Corporation, New York, N.Y.

[21] Appl. No.: 231,135

[22] Filed: Feb. 3, 1981

[51] Int. Cl.³ .............................................. B01D 46/02
[52] U.S. Cl. ....................................... 55/379; 55/381; 55/302; 150/1
[58] Field of Search .................................. 55/378–382, 55/365, 302; 112/418; 210/323 T; 229/55; 150/1

[56] References Cited

U.S. PATENT DOCUMENTS

| | | | |
|---|---|---|---|
| 1,336,600 | 4/1920 | Tattle | 55/291 |
| 1,445,835 | 2/1923 | Hooper | 150/1 |
| 1,969,261 | 8/1934 | Eiben | 55/381 |
| 2,308,310 | 1/1943 | Ruemelin, Jr. et al. | 55/378 |
| 3,410,061 | 11/1968 | Knight | 55/378 |
| 3,429,107 | 2/1969 | Graves | 55/381 |
| 3,550,359 | 12/1970 | Fisher et al. | 55/379 |
| 4,056,374 | 11/1977 | Hixenbaugh | 55/378 |

*Primary Examiner*—Bernard Nozick
*Attorney, Agent, or Firm*—Nims, Howes, Collison & Isner

[57] ABSTRACT

A filter bag having a protective cuff adjacent the closed "free" end of the filter bag for protecting the "free" end from abrasion damage. The protective cuff is preferably formed of a band of material attached circumferentially to the outer wall of the filter bag along a longitudinal edge of the band. The longitudinal edge is attached to the filter bag such that the longitudinal edge is spaced from the "free" end by a distance less than the width of the band.

4 Claims, 5 Drawing Figures

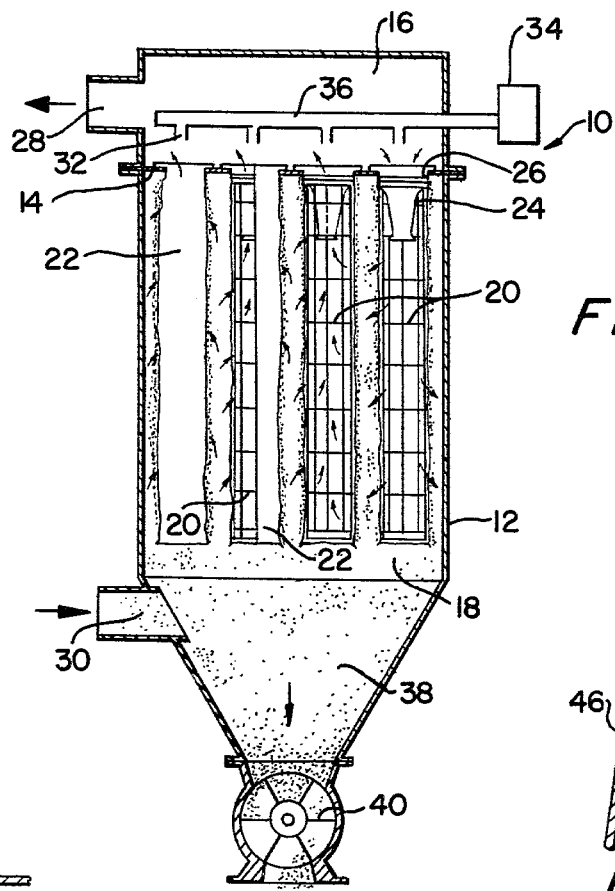
FIG.1
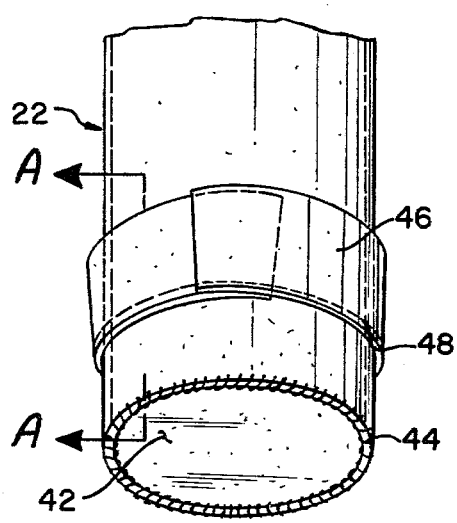
FIG.3
FIG.2
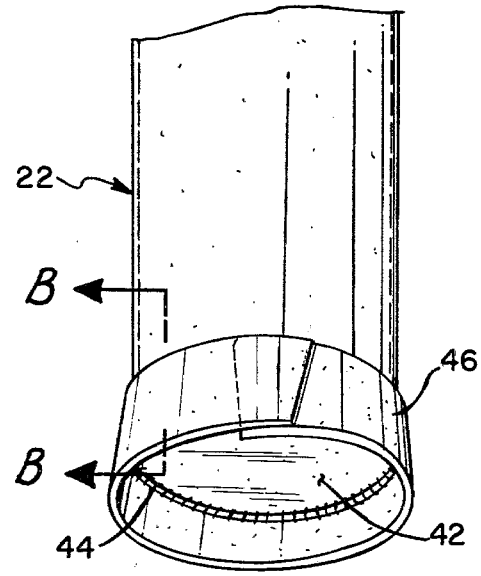
FIG.5
FIG.4

FILTER BAG WITH PROTECTIVE CUFF

BACKGROUND OF INVENTION

This invention relates to a filter bag having a protective cuff or skirt which protects the "free" end portion of the filter bag opposite the end mounted to an apertured plenum chamber plate from abrasion damage and the like.

Filter bags are commonly used in dust collectors to remove dust and other particulate matter from dirty air before being exhausted into the atmosphere. These filter bags are mounted in bag houses conventionally having from 4 to several thousand filter bags mounted to an apertured plenum chamber plate. The filter bags may be of any desired length but conventionally they may be from 6 to 20 feet in length.

The filter bags having a protective cuff according to the present invention have particular value in a multiple filter bag collector which employs pulse jet cleaning techniques for cleaning the elongate tubular filter bags. Cleaning of the filter bags in these bag houses is effected by the abrupt and momentary introduction of a high energy pulse of air or gas into the interior of the filter bag. Such a pulse produces a momentary pressure differential countercurrent to that extant during normal filter flow causing the dislodgement of accumulated dust particles from the outer wall of the filter bag. It is common in this type of bag house for the filter bag assemblies including the filter bags and associated retainers to strike and rub against one another and against the bag house housing thereby abrading the filter bag material which eventually renders the filter bags ineffective.

Bag houses may be of the top mounted filter bag or bottom mounted filter bag type. A top mounted filter bag has the filter bags depending from the apertured plenum chamber plate or tube sheet. When a filter bag must be replaced, the filter bag with the supporting retainer is removed from the tube sheet and the old filter bag is taken off the retainer and replaced with a new filter bag. The retainer with the new filter bag is then reinserted through the tube sheet and the retainer and filter bag are secured in place.

Each tubular filter bag has an open end mounted to the tube sheet covering an aperture in the tube sheet. The other end is closed and is referred to herein as the "free" end. This closed end has an end piece, which when the filter bas has a circular cross-section is a disc element, sewn circumferentially to the wall of the filter bag to close this end of the filter bag.

In conventional bag houses, the spacing between bags is approximately 2½ inches. In top removal bag houses the workers who replace filter bags cannot observe and adjust the position of the filter bag assemblies when the retainer with filter bag is reinserted through the tube sheet after replacement of the filter bag. In the case of a 12 foot long filter bag which is positioned axially one degree out of plumb, the deflection at the bottom is 2½ inches, which as noted above, is the conventional spacing of filter bags in a bag house. When retainers of adjacent filter bag assemblies strike each other during normal pulse jet cleaning, the retainers have a tendency to cut the filter bag material at the "free" ends of the filter bag and abrade the stitching of the end piece to the filter bag wall.

In addition to the above described mechanical abrasion, the stitching of the closed end may be subjected to areodynamic abrasion caused by the inlet dirty air, carrying particulate matter, striking the end wall of the filter bag when dirty air is forced into the bag house under pressure. The velocity of the dirty air may be such to cause substantial wear to the stitching at the closed end. The protective cuff contemplated by the present invention provides protection from this condition.

SUMMARY OF THE INVENTION

A filter bag with a protective cuff according to the present invention protects the "free" end of the filter bag from abrasion damage.

The filter bag according to the present invention includes a band of material such as filter material attached circumferentially to the outer wall of the filter bag along a longitudinal edge of the band. The band is attached so that the longitudinal edge is positioned in spaced apart relation from the "free" end with the spaced distance being less than the width of the band. In a preferred embodiment, the longitudinal edge of the band attached to the outer wall of the filter bag is the edge closest the "free" end. The band is then folded along the attached edge toward the "free" end whereby the longitudinal edge not attached to the filter bag extends beyond the "free" end to form a protective cuff for protecting the "free" end from damage.

This protective cuff protects the filter bag end from abrasion damage during normal pulse jet cleaning operations and increases the useful life of the filter bag. Furthermore, in the preferred embodiment wherein the band is folded down over the end of the filter bag, the construction is such to slightly compress the side wall of the filter bag along the line of attachment of the band with the filter bag. This tends to reduce the diameter of the filter bag along the line of attachment thereby tending to cause the filter bag to fit more snuggly over the retainer at this point. This tends to eliminate motion of the filter bag with respect to the retainer which would otherwise accelerate filter bag failure.

BRIEF DESCRIPTION OF THE DRAWINGS

In order that the invention may be clearly understood and readily carried into effect, several preferred embodiments will now be described, by way of example only, with reference to the accompanying drawings wherein:

FIG. 1 is a schematic elevational cross-sectional view with portions removed of the operational components of a conventional top removal filter bag house which employs pulse jet cleaning;

FIG. 2 is a partial perspective view of the "free" end of a filter bag according to the present invention;

FIG. 3 is a cross-sectional view of the filter bag along line A—A in FIG. 2;

FIG. 4 is a perspective view of the filter bag shown in FIG. 2 with the protective cuff folded over the "free" end of the filter bag; and FIG. 5 is a cross-sectional view of the filter bag along line B—B in FIG. 4.

DESCRIPTION OF A PREFERRED EMBODIMENT

Referring to FIG. 1, there is schematically shown the operating components of a conventional bag house or collector 10 having top removal filter bag assemblies. These collectors conventionally include a housing 12 having a transversely mounted gas impervious tube sheet 14 therein which subdivides the interior of the housing 12 into a clean air plenum chamber 16 and a dirty air plenum chamber 18.

A plurality of elongate generally cylindrical gridlike filter bag retainers 20 are removably secured to the tube sheet 14 in depending relation. The retainers support filter bags 22.

The interior of each of the retainers 20 is in fluid communication with the clean air plenum chamber 16 through the open upper ends thereof which normally include a venturi 24 disposed within a suitable receiving aperture 26 in tube sheet 14.

During normal filter flow operation, the carrier gas bearing the particulate material to be separated is directed by a fan or other prime mover (not shown) usually located downstream from a clean air exhaust conduit 28, through an entry conduit 30 into the dirty air plenum 18 and through the filter bags 22 into the interior of the retainers 20, thence upwardly through the venturi 24 into the clean air plenum 16 and thence externally of the housing 12 through the clean air exhaust conduit 28.

The particulate matter carried by the dirty air or carrier gas stream is accumulated, during normal filter flow, on the outer surfaces of the filter bags 22 where such accumulation operates to progressively reduce the permeability of the filter bag material. Removal of such separated particulate matter from the external surfaces of the filter bags 22 in the illustrated embodiment is effected by the abrupt and momentary emission of jets of high energy cleaning gas from jet nozzles 32 disposed in spaced axial alignment with the venturi 24.

During the cleaning cycle of such pulse jet type dust collectors, a quick acting valve 34 is periodically actuated to permit the transfer of compressed cleaning gas from a remote source (not shown) into the interior of an elongate blow pipe 36 to which are connected the jet nozzles 32. The compressed cleaning gas exits in jet form from the nozzles 32 as pulses of high energy gas of very short duration, i.e., normally 1/10 second or less. Such pulses are designed to mementarily halt the normal filter flow of carrier gas upwardly through the venturi 24 and create an abrupt and momentary pressure rise within the filter bag 22 with a reverse air flow which dislodges the particulate matter from the external surfaces of the filter bags 22. This particulate matter falls into a hopper 38 from which it is periodically removed through a rotary airlock type valve assembly 40.

Referring now to FIG. 2, a perspective view of the "free" end portion of a filter bag 22 is shown which in this illustrated embodiment is the bottom end of such filter bag. The filter bag 22 has an end wall 42 which as shown in this embodiment comprises a disc of filter material. This end wall 42 is stitched to the bottom circumferential edge of the side wall of filter bag 22 as at 44.

A protective cuff 46 preferably formed of the same material as the filter bag 22 comprises a band of material which is sewn circumferentially to the filter bag 22 along a longitudinal edge of the band as at 48 as shown in FIGS. 2 and 3. This longitudinal edge is sewn to the filter bag 22 in spaced apart relation from the end wall 42 with the distance of separation being less than the width of the band forming the protective cuff 46.

The protective cuff 46 is then folded along the stitching at 48 toward the end wall 42 as shown in FIGS. 4 and 5. The protective cuff 46 in this position extends beyond the end wall 42 and serves to protect the stitching 44 of end wall 42 to the side wall of filter bag 22 from abrasion damage.

As shown in FIG. 1, adjacent filter bags 22 are spaced from one another. In conventional bag houses, this spacing is such that adjacent filter bags 22 commonly rub against one another and as the retainers 20 with corresponding filter bags 22 strike one another during normal pulse jet cleaning, the retainers 20 tend to cut and abrade the corresponding "free" ends of the filter bags 22. With the protective cuff 46 as shown in FIG. 4, abrasion damage to the "free" ends of filter bag 22 is reduced because the protective cuffs 46 of adjacent filter bags 22 rub against one another instead of the filter bags themselves. These protective cuffs 46 cushion the filter bags 22 when the retainers 20 strike each other with the filter bags during normal pulse jet cleaning further reducing abrasion damage. Furthermore, the protective cuffs 46 protect the filter bags 22 from abrasion when the filter bags rub against the housing 12 of the collector and protect the stitching 44 from aerodynamic abrasion caused by the dirty air carrying particulate matter striking the stitching under operating velocities.

An additional advantage of the protective cuff 46 as shown in FIG. 4 results when the cuff 46 is folded over the "free" end. Since the filter bag 22 is inserted over the retainer 20, there is some play between the retainer 20 and the filter bag 22. When the protective cuff 46 is folded downward as shown in FIG. 2, the diameter of the filter bag 22 where the protective cuff 46 is sewn to the filter bag 22 is reduced as shown in FIG. 5 whereby the filter bag 22 fits more snuggly on the retainer 20 and play between the filter bag 22 and the retainer 20 is reduced. Thus, the usable life of the filter bag 22 with this protective cuff 46 is increased.

Other embodiments of the present invention are contemplated. For example, the protective cuff 46 could be sewn to the filter bag with a longitudinal edge of the band extending below the end wall 42 thus obviating the folding operation discussed above. With this embodiment, however, the advantage of reduced play between retainer 20 and filter bag 22 is not obtained.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claims:

We claim:

1. An improved construction for elongate tubular filter bags having one open end and one closed end that are adapted to be supported by an internal elongate rigid gas pervious retainer for use in an assembly for separating particulate matter from a carrier gas stream when such carrier gas stream is directed from a dirty air plenum to a clean air plenum separated by a gas impervious tube sheet having at least one aperture therein providing fluid communication between the dirty and clean air plenums and wherein the open end of such filter bag and retainer is mounted on said aperture and the closed end is disposed remote therefrom and is displaceable together with said retainer transversely of the longitudinal axis of said filter bag, said improved bag comprising:

an elongate tube of permeable fabric filter material having an open end and a second end disposed remote therefrom;

particulate impermeable means for closing said second end of said tube, means attaching said particulate impermeable means to the second end of said tube to close the same, an annular band of material having a first and second longitudinal edge and a length at least equal to the circumference of said tube, means circumferentially attaching said band to the outer surface of the tube with the first longitudinal edge thereof disposed in attached spaced apart relation from the closed end thereof and with the distance of spacing between the first longitudinal edge and the closed end being less than the width of the band so that the second longitudinal edge thereof extends a substantial distance past said closed end of said tube and forms a peripheral protective skirt thereabout.

2. The filter bag according to claim 1 wherein the first longitudinal edge is attached to the tube in facing relation to the closed end, the second longitudinal edge folded over the first longitudinal edge and extending beyond the closed end to protect the closed end from abrasion damage.

3. In apparatus for separating particulate matter from a carrier gas stream when such carrier gas stream is directed from a dirty air plenum to a clean air plenum separated by a gas impervious tube sheet having at least one aperture therein providing fluid communication between the dirty and clean air plenums the improvement comprising:

elongate rigid gas pervious retainer means suspended from said aperture in said tube sheet and having a remote free hanging lower end disposed in said dirty air plenum and displaceable transversely of the longitudinal axis of said retainer means, an elongate tube of permeable fabric filter material disposed around said retainer means having an open end covering said aperture and a remote second open end particulate impermeable means for closing said second end of said tube, means attaching said particulate impermeable means to the second end of said tube to close the same and cover the lower end of said retainer means so that the carrier gas passes through said tube of filter material on its passage from the dirty air plenum to the clean air plenum, an annular band of material having a first and second longitudinal edge and a length at least equal to the circumference of said tube, means attaching said annular band to the outer surface of the tube of filter material with the first longitudinal edge thereof disposed in attached spaced apart relation from the closed end thereof and with the distance of spacing between the first longitudinal edge and the closed end being less than the width of the band so that the second longitudinal edge thereof extends a substantial distance past said closed end of said tube of filter material and forms a peripheral protective skirt thereabout.

4. Apparatus according to claim 3 wherein the first longitudinal edge is attached to the tube in facing relation to the closed end thereof, the second longitudinal edge folded over the first longitudinal edge and extending beyond the closed end of said tube of filter material.

* * * * *